July 20, 1926.
E. L. DELANY
1,593,547
TOILET SEAT AND METHOD OF MAKING THE SAME
Filed March 6, 1925
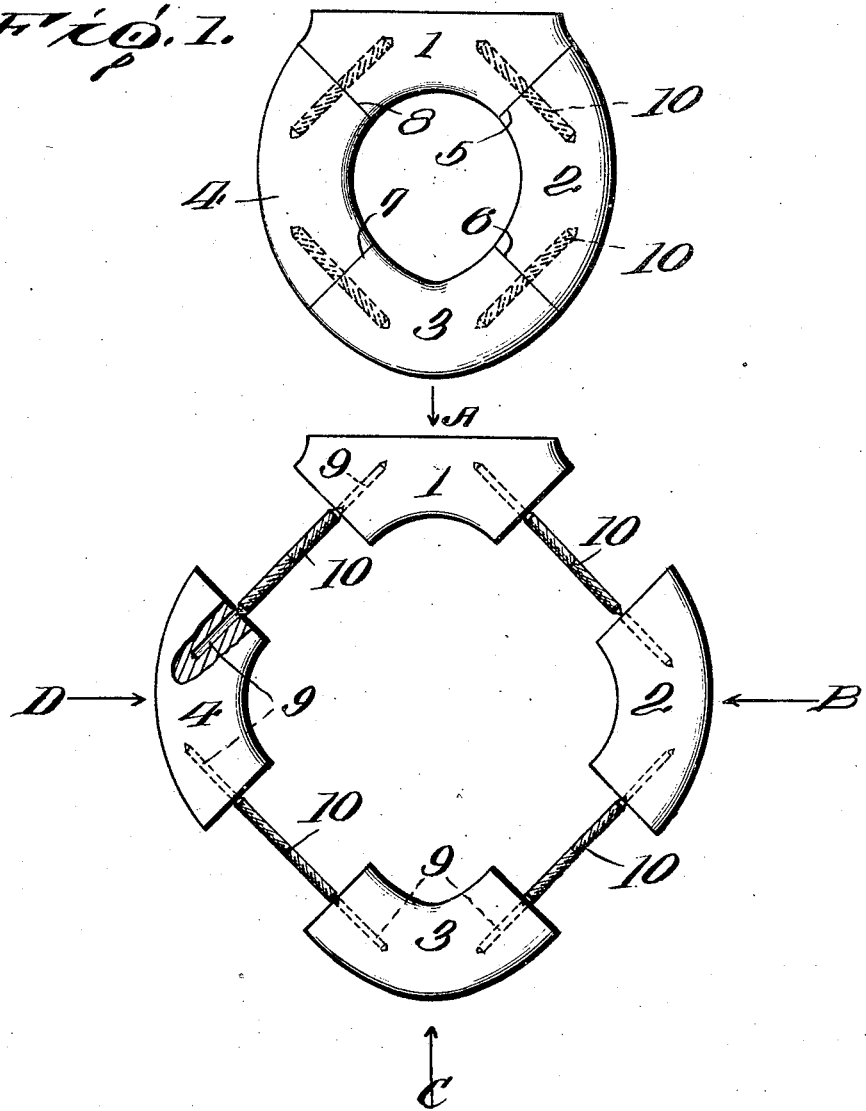

Patented July 20, 1926.

1,593,547

UNITED STATES PATENT OFFICE.

EDWARD L. DELANY, OF BROOKLYN, NEW YORK, ASSIGNOR TO DELANY REALTY CORPORATION, OF BROOKLYN, NEW YORK.

TOILET SEAT AND METHOD OF MAKING THE SAME.

Application filed March 6, 1925. Serial No. 13,645.

My invention relates to improvements in toilet seats and method of making the same.

The object of my invention is to provide an improved toilet seat and method of making the same, whereby it is made up of three or four sections, and firmly secured together by screw threaded members having right and left hand threads so that the same are wholly out of sight, and provide a seat in which there are no openings to be filled up thus producing a perfectly plain outer face having the appearance of a one piece seat, when completed.

Another object of my invention is to provide a seat of this character in which the several sections are secured together by screw threaded connecting members having right and left hand threads, applied by pressure, simultaneously on each section, forcing them inwardly towards the axis of a circle, whereby the threaded members are caused to rotate and travel into the sections and drawing and locking the sections with their edges abutting.

A further object of my invention is to provide a simple, cheap and effective toilet seat and method of making the same, whereby considerable time, labor and expense is saved in the manufacture thereof, and at the same time produce a seat having sufficient strength to withstand the strains to which it is subjected.

In the accompanying drawings:—

Figure 1 is a top plan view of my improved seat showing it made of four sections, and assembled.

Figure 2 is a top plan view showing the threaded connecting members in their operating positions before pressure is simultaneously applied to each of the sections.

In the illustration herein shown, I have shown my improved seat composed of four sections, but it will be understood that the same could be made of three or more sections without departing from my invention.

In the form shown in the drawings, the sections 1, 2, 3 and 4 when the seat is completed have their meeting edges 5, 6, 7 and 8 arranged in the radii of a circle, which insures of the proper securing together of the sections by pressure, as will be hereinafter more fully described.

As shown in Figure 2 of the drawings, the meeting edges of each section are provided with openings 9, bored therein at an angle approximately at right angles to the line of separation. These openings as shown, are of a diameter less than the threaded portions of the connecting members 10 whereby when pressure is applied at the points A, B, C and D of each section, the sections travel inwardly towards the axis of the circle, and the screw threaded members 10 rotate, drawing and locking the sections together with their abutting edges close together, as shown in Figure 1 of the drawings.

I have shown the form of threaded connecting member shown in application filed February 10, 1925, Serial No. 8,278 in which I am a joint inventor.

By this structure and method it will be seen that I am able to make a four piece seat, the threaded securing means each being caused to rotate at the same speed so that the four sections are firmly secured together by the simultaneous equal pressure on the four sections at the points A, B, C, and D.

As herebefore stated, while I have shown four sections it will be understood that the same could be made of a greater number of sections the operation of the sections would be the same, but in such an event the pressure would have to be applied to each section in a radial line, the same as shown in the four piece seat.

While I have shown and described the meeting edges arranged in the radii of a circle it will be understood that the same could be arranged at different angles, but in each event the movement of the sections must be radial towards the axis of the circle, to cause the threaded members to rotate and screw into the sections.

The threaded members 10 are shown at right angles to the line of movement of the sections in assembling which enables the openings to be more accurately bored, but it will be understood that the threaded connecting member could be arranged at any angle to the line of movement of the section or the line of separation.

Having thus fully described my invention what I claim is:—

1. A toilet seat comprising sections connected together by threaded members extending transverse the meeting edges of the sections, and said members having right and left hand wood threads, and adapted to rotate and enter the sections by pressure only on the sections.

2. A toilet seat comprising sections connected together by threaded members extending transverse the meeting edges of the sections, said members having right and left hand wood threads, each threaded portion having a series of threads and adapted to rotate and enter the sections by pressure only on the sections.

3. A toilet seat comprising four sections having their abutting edges arranged in radial lines and connected together by threaded members extending transverse the meeting edges of the sections, said members having right and left hand wood threads adapted to rotate and enter the sections by pressure on each section.

In testimony whereof, I have signed this specification.

EDWARD L. DELANY.